Patented Aug. 10, 1926.

1,595,754

UNITED STATES PATENT OFFICE.

JOSEPH BRESLAUER, OF GENEVA, SWITZERLAND, ASSIGNOR TO COMPAGNIE DE L'AZOTE ET DES FERTILISANTS S. A., OF GENEVA, SWITZERLAND, A CORPORATION OF SWITZERLAND.

PROCESS FOR THE PREPARATION OF A SOLUTION OF CYANAMIDE FROM COMMERCIAL CALCIUM CYANAMIDE.

No Drawing. Application filed November 14, 1924, Serial No. 749,996, and in Switzerland November 20, 1923.

The present invention relates to a process for the preparation of a solution of cyanamide from commercial calcium cyanamide by introducing the calcium cyanamide in small quantities into water which is continually saturated by carbon dioxide ($CO_2$) preferably under pressure.

This invention consists principally in determining the time for the introduction of the calcium cyanamide into the solution by determining the time at which the emission of the sulphureted hydrogen is at its maximum, and in introducing each additional quantity or portion of the calcium cyanamide employed when the emission of the sulphurated hydrogen is at its maximum.

When solutions of free cyanamide are prepared by adding calcium cyanamide to water which is continually saturated with carbon dioxide ($CO_2$) either at ordinary atmospheric pressure or under pressure in an autoclave, it is necessary to determine in some certain manner when the reaction is complete before adding a new portion of the calcium cyanamide. The end of the decomposition of the calcium cyanamide may be ascertained at the very moment when the liquid becomes acid. But this method is not always quite certain as it depends upon the physical nature of the product employed. In this process it is necessary to work with very thick suspensions of black material which often make it difficult to determine the effective end of the reaction and may cause very prejudicial losses of time and of carbon dioxide.

The present invention provides a working method which is novel and constitutes a sure criterion of the end of the reaction between carbon dioxide ($CO_2$) and calcium cyanamide ($CN_2Ca$) by the determination of the sulphureted hydrogen which is set free during the operation. This gas comes from the decomposition by the carbon dioxide of the calcium sulphide (CaS) which is always present in the commercial calcium cyanamide. The practice has shown that this decomposition occurs in a notable manner only after the decomposition of the calcium cyanamide by carbon dioxide.

One may proceed for instance as follows: Into a vigorously stirred solution continually saturated with carbon dioxide there is introduced in small portions powdery calcium cyanamide, each new portion being added only after the preceding portion is completely decomposed.

In order to recognize this moment, a predetermined volume of the gas escaping from the apparatus is collected from time to time and the amount of sulphureted hydrogen contained therein is determined. At the beginning of the reaction there is no sulphureted hydrogen, then the amount of this gas increases suddenly and passes through a maximum, whereafter it decreases and becomes zero. The practice shows that there is no more cyanamide retained in combination with calcium when the emission of sulphureted hydrogen reaches its greatest value.

As the contents of sulphide of calcium (CaS) varies according to the commercial calcium cyanamide employed, it is advisable to determine the contents each time, in order to know the maximum quantity of slphuretted hydrogen corresponding to the decomposition of a predetermined quantity of calcium cyanamide.

The following table shows in one column the quantities of sulphureted hydrogen ($SH_2$) in milligrams set free every 10 minutes when 50 gr. of a sample of calcium cyanamide were treated and in the other column the percentage of cyanamide set free.

| Time. | $SH_2$mmg. | Per cent free cyanamide. |
|---|---|---|
| 10 minutes | 0.51 | 28.9 |
| 20 minutes | 1.19 | 80.2 |
| 30 minutes | 2.50 | 89.2 |
| 40 minutes | 37.11 | 100 |
| 50 minutes | 31.79 | |
| 60 minutes | 2.72 | |

It results from these figures that at the beginning of the reaction the quantity of $SH_2$ set free is zero, that it does then increase suddenly, and passes through a maximum, whereafter it decreases and finally becomes zero. The maximum does exactly correspond to the moment at which the whole of the cyanamide is set free.

It has been found that in carrying out the invention under normal conditions three and one-half (3½) to four (4) parts of water or solution may be advantageously employed to one (1) part of calcium cyanamide. This proportion makes it possible to adequately stir the solution and to obtain the best results in carrying out the process. It has also been found that while the temperature of the solution may vary, the best results are obtained at a temperature below 40° C. and preferably at approximately 30° C.

I claim:

1. A process for the preparation of cyanamide from commercial calcium cyanamide, consisting in introducing commercial calcium cyanamide into a saturated solution of carbon dioxide thereby freeing sulphureted hydrogen, and then introducing an additional quantity of calcium cyanamide only when the emission of the sulphureted hydrogen has reached its maximum.

2. A process for the preparation of cyanamide from commercial calcium cyanamide, consisting in introducing calcium cyanamide in a small quantity into water saturated with carbon dioxide to free sulphureted hydrogen, and then introducing an additional small amount of calcium cyanamide only when the emission of the sulphureted hydrogen has reached its maximum.

3. A process for the preparation of cyanamide from commercial calcium cyanamide, consisting in introducing calcium cyanamide into a saturated solution of carbon dioxide under pressure thereby freeing sulphureted hydrogen, and then introducing an additional quantity of calcium cyanamide only when the emission of the sulphureted hydrogen has reached its maximum.

4. A process for the preparation of cyanamide from commercial calcium cyanamide, consisting in introducing calcium cyanamide in a small quantity into water saturated with carbon dioxide under pressure to free sulphureted hydrogen, and then introducing an additional small amount of calcium cyanamide only when the emission of the sulphureted hydrogen has reached its maximum.

5. A process for the preparation of cyanamide from commercial calcium cyanamide, consisting in introducing a small quantity of calcium cyanamide into a saturated solution of carbon dioxide, then determining the time of the maximum emission of sulphureted hydrogen, and then adding another quantity of calcium cyanamide at the time of the maximum emission of sulphureted hydrogen.

6. A process for the preparation of cyanamide from commercial calcium cyanamide, consisting in introducing a small quantity of calcium cyanamide in water saturated with carbon dioxide under pressure, then determining the time of the maximum emission of the sulphureted hydrogen liberated, and then adding another small quantity of calcium cyanamide at the time of the maximum emission of the sulphureted hydrogen.

In testimony whereof I have affixed my signature.

JOSEPH BRESLAUER.